UNITED STATES PATENT OFFICE.

HOLLIS W. MERRILL AND JAMES W. HOITT, OF LYNN, MASSACHUSETS, ASSIGNORS TO NATIONAL BOOT AND SHOE TIP COMPANY.

IMPROVEMENT IN PROCESSES OF PREPARING AND COLORING HIDES.

Specification forming part of Letters Patent No. 170,100, dated November 16, 1875; application filed August 5, 1875.

*To all whom it may concern:*

Be it known that we, HOLLIS W. MERRILL and JAMES W. HOITT, of Lynn, in the county of Essex and State of Massachusetts, have invented certain new and useful Improvements in the Process of Preparing and Coloring Hides, of which the following is a full, clear, and exact description:

The object of our invention is to prepare and color raw hides in such a manner that they will be thoroughly permeated by the materials used, and thus rendered more durable and neat in appearance for the various purposes to which prepared hide is applicable in the arts.

The hides to be colored are unhaired, unfleshed, and rinsed in the usual manner, and being removed from the rinsing-vat are prepared for coloring by being run, preferably, through a lukewarm logwood-liquor. This logwood-liquor is made by placing a third of a bushel of logwood, in chips or coarse powder, in a bag, in which it is boiled in about twelve gallons of water until the strength of the logwood is extracted. A sufficient quantity of the liquor is made for use, as wanted. The hides are opened and laid flat, one above the other, in a vat containing a sufficient quantity of this logwood-liquor to easily cover them, the temperature of the liquor being preferably lukewarm, as experience demonstrates that at this temperature the hides better absorb the logwood. This liquor may, however, be colder than lukewarm, and in such case the hides must remain longer in the liquor. The hides are kept in this liquor for two or three days, and are frequently turned in the liquor until the strength of the liquor is extracted or exhausted, and until the hides are saturated, the action being more complete than it would be were the hides folded.

The hides having been treated or prepared as above described are then colored or blacked in a dyeing-liquor made in the manner hereinafter set forth, by means of the solutions here designated for convenience of description as Nos. 1 and 2.

The solution No. 1 is made by boiling together for five or ten minutes four ounces each of pulverized nut-galls and blue vitriol in a gallon of hot logwood-liquor, and afterward adding four quarts of vinegar saturated with iron in any well-known way, or the chemical equivalent of the vinegar and iron may be used.

Solution No. 2 is an iron-set, made by dissolving iron chips in aquafortis or other acids, the iron being added until a saturated solution is obtained.

For the purpose of thoroughly blacking about half a dozen hides, or two or three dozen medium-sized skins, we place the hides previously soaked in logwood-liquor in about twenty-four gallons of logwood-liquor such as first described, to which has been added about two quarts of the solution No. 1 and about one pint of No. 2 solution, the latter solution having a tendency to set the color or cause it to penetrate the hides. The hides should be allowed to remain in this dye-liquor from one to three days, according to their thickness, they being frequently turned to secure a thorough penetration of the dyeing-liquor into the hides.

It may be remarked that the exact quantities above given are not arbitrary, as the ingredients vary in strength, and some hides will take color more easily than others. The quantities mentioned will generally be sufficient to thoroughly black two dozen calf-skins or a half dozen kips or light cow-hides; but the heavier hides require to remain longer in the dye-liquor.

The dyeing-liquor only requires to be replenished as its strength is exhausted, by the addition of fresh material, to keep it in substantially the proportions just described. Maroon and purple colors may be made by working in the logwood-liquor and finishing by using aquafortis and tin, with solution of logwood, instead of the dyeing-liquor.

Rawhide after being subjected to this treatment, in which it is only partially tanned, is rendered a deep and permanent color throughout its entire surface, is better capable of resisting moisture, and is susceptible of a high polish, giving it a neat and finished appearance similar to that of hard black rubber. It can be prepared at exceedingly low cost, does not become rusty or discolored by use, but retains its original neat appearance until completely worn out, and is thus of great value in the manufacture of tips or shields for the toes of boots and shoes, and of similar or other articles liable to rough usage.

Logwood has been described as the base from which the solution is obtained. It is selected because it is the cheapest and most readily obtained; but it is evident that more expensive materials—as nut-galls and other equivalent dyes from wood or vegetables—may be used instead of logwood.

In the preparation of No. 1 solution we have described that the blue vitriol and nut-galls were placed in hot logwood-liquor. This we prefer, but instead of logwood-liquor we might use hot water, increasing the quantity of nut-galls.

We claim—

The process herein described of preparing and coloring raw hides, consisting in soaking the unhaired and unfleshed hides in the logwood-liquor, and then in a dyeing-liquor composed of logwood-liquor, nut-galls, blue vitriol, vinegar, and an iron-set, or their equivalents, substantially as described.

In testimony whereof we have hereunto set our hands this 22d day of July, 1875.

HOLLIS W. MERRILL.
JAMES W. HOITT.

Witnesses:
N. M. HAWKES,
CHARLES W. GAY.